United States Patent [19]
Weiss

[11] Patent Number: 4,754,482
[45] Date of Patent: Jun. 28, 1988

[54] METHOD AND APPARATUS FOR SYNCHRONIZING ENCRYPTING AND DECRYPTING SYSTEMS

[75] Inventor: Jeffrey A. Weiss, Smithfield, R.I.

[73] Assignee: Samco Investment Company, Providence, R.I.

[21] Appl. No.: 32,472

[22] Filed: Mar. 30, 1987

Related U.S. Application Data

[63] Continuation-in-part of Ser. No. 801,797, Nov. 26, 1985, Pat. No. 4,654,480.

[51] Int. Cl.⁴ .............................................. H04K 1/00
[52] U.S. Cl. ........................................ 380/48; 371/47
[58] Field of Search ..................... 380/48; 371/42, 46, 371/47

[56] References Cited

U.S. PATENT DOCUMENTS 4,654,480 3/1987 Weiss ..................................... 380/48

Primary Examiner—Salvatore Cangialosi
Attorney, Agent, or Firm—Wolf, Greenfield & Sacks

[57] ABSTRACT

A synchronization method and corresponding apparatus for transmitting or storing encrypted data breaks the data into blocks and appends to each block an error detection code which is calculated from the encrypted data block plus a unique sequence number. The sequence number is generated by a local counter and may be the number of bits, bauds, or characters transmitted and received since a previous resynchronization. The error correcting code is transmitted or stored with the encrypted data block, but although the sequence number is appended to the data block for error code calculation purposes, it is not actually transmitted or stored with the encrypted data and error correcting code. When the encrypted data is retrieved or received, the receiving apparatus appends to the received data blocks a sequence number derived from a local counter which is synchronized to the counter at the transmitting or storing apparatus and a new error detecting code is calculated for comparison to the error detecting code received or retrieved with the encrypted data. A mismatch between the error detecting codes indicates a transmission or synchronization error for that block. In either case the data block can be retransmitted.

12 Claims, 2 Drawing Sheets

METHOD AND APPARATUS FOR SYNCHRONIZING ENCRYPTING AND DECRYPTING SYSTEMS

REFERENCE TO OTHER APPLICATIONS

This application is a continuation in-part of application Ser. No. 801,797, filed Nov. 26, 1985 for METHOD AND APPARATUS FOR SYNCHRONIZING ENCRYPTING AND DECRYPTING SYSTEMS, now U.S. Pat. No. 4,654,480.

FIELD OF THE INVENTION

This invention relates to methods and apparatus for insuring synchronization of systems which encode and decode encrypted data for transmission or storage.

BACKGROUND OF THE INVENTION

Due to the proliferation of micro-computers distributed processing systems have become commonplace. In such a system the data processing functions are spread over a number of separate data processing machines. Each of the machines performs part of the overall processing task and data and results are passed between the machines by means of data links. In many environments a distributed processing system poses a problem for data integrity and security because sensitive data must be transmitted between the separate data processing machines over transmission facilities, such as telephone lines, which are far from secure. In other cases, a centralized data processing facility may have the capability of being accessed from many outlying locations by means of data terminals over dedicated data lines or public telephone lines.

Such systems are prone to to misuse from a variety of sources such as illicit access to the system by computer "hackers" or disgruntled employees and improper disclosure or modification of stored information by unscrupulous competitors.

To protect the privacy of data communications and to prevent improper modification of data exchanged between two processing locations over insecure communication networks, a number of prior art methods and apparatus have been developed. One general category of prior art data security systems are password systems. These systems require the entry of a password before they will allow access to a secure data processing installation. Password systems are simple to implement but are also easy to circumvent. For a price, any password can be obtained, or passwords can be guessed.

A second category of prior art security systems are called automatic call back systems. In operation, callback systems respond to an incoming phone call by requesting a user identification code. In response, the user enters his secret code. After receiving the code the call-back system terminates the call. The identification code is looked up in an directory to find an associated call-back telephone number and then a return call is placed to the call-back number.

The call-back system eliminates illicit access by most casual hackers, but suffers from a number of problems. Callers must always call into the computer from a fixed telephone number which is stored in the system, therefore, salesmen and others who are mobile are precluded from remote access. Another problem is that the system is not immune to illicit entry by means of telephone line taps, or redirection of a line through call forwarding.

Due to the above problems, variations of call back systems have been developed in the art. One such variation, in addition to the normal call back operation, can also operate with a special modem which sends an identity code to the central site when prompted by the central site controller. This latter variation allows remote access by mobile personnel who can carry the modem with them. However, the system is less secure than the simple call-back system since the identification code sent down the line by the modem can be intercepted by a line tap.

To avoid the previous problems with password and call-back systems, cryptographic techniques are becoming more frequently utilized by commercial organizations. These systems modify a message to produce another message which is unintelligible except to those persons possessing proper decoding equipment. In particular, most encryption systems use mathematical algorithms to convert between ordinary messages called "plain text" and encoded messages called "cipher text". The encoding or encrypting algorithm used to convert the plain text into a cipher text is chosen such that it is possible to retrieve the plain text when given the cipher text. To change the cipher text back into the plain text a decoding or decrytping algorithm is used which may be the same or different from the encoding algorithm.

The are two generally used types of cryptographic algorithms: block ciphers and stream ciphers. With block cipher encoding all plain text messages to be encrypted are divided up into "blocks" of text which are equally long. The encoding algorithm is applied to each block without taking encodings of previous or subsequent blocks into account. The second encoding method is stream cipher encoding in which each single character in the plain text message is encoded separately but the output of the encryption algorithm depends not only on the character to be encrypted, but also on the outputs of the encryption algorithm produced by encryption of the previous characters.

Both encryption methods have advantages, but the main reason for using stream cipher encoding is that it is more secure than block encoding. In particular with block encoding the sam plain text always produces the same cipher text each time it is passed through the encoding system. Thus, it is easier to "crack" the code if enough cipher text can be intercepted. With stream ciphers, decoding the same plain text produces different cipher text each time the text is passed through the system.

Since many users want to encode not only one message but many and since the intended recipients of the messages are frequently different, a new encoding algorithm cannot be used for each message or for each of the recipients as this would quickly become highly impractical. Consequently, in practical encryption systems, one encoding algorithm is used with many different parameters, called "keys", instead of many different algorithms. Thus, the key becomes another input, or argument, to the encoding algorithm along with the plain text message characters. In such systems, a decoding key is often required as an additional input to the decoding algorithm with the cipher text in order to be able to reproduce the plain text.

In the more complicated encryption systems, the encoding algorithms are publicly known but the encoded message cannot be recovered from the cipher text without knowledge of the decoding key. Thus, such cryptographic systems are attractive because they do not require that the entire system be kept secure, only the encoding and decoding keys.

The most popular method of encryption in the United States, is the so-called "Data Encryption Standard" or D.E.S. The operation and theory of this encryption method is well known and discussed in detail in Federal Information Processing Standard (FIPS) publication No. 46, and U.S. Pat. No. 3,958,081. The basic algorithm set forth in the D.E.S. publications (the D.E.S. algorithm) uses a key consisting of 56 digital bits, and performs a non-linear encoding or decoding of eight bytes (each byte is a digital coding of one plain text character) of data presented to it. To construct a system which uses the basic D.E.S algorithm several techniques are often utilized, some of which have added benefits such as the avoidance of synchronization problems between the encoding and decoding sites and the enhancement of overall security.

FIPS publication No. 81 describes several standardized encryption systems which use the basic D.E.S. algorithm. The simplest technique disclosed is called "Electronic Code Book". This technique is basically a block encoding scheme in which eight bytes (characters) of plain text are passed through a circuit which performs the D.E.S. encryption algorithm to yield eight bytes (characters) of cipher text. At the receiving end, eight bytes of cipher text are processed by a D.E.S. decoding circuit to reproduce the original eight bytes of plain text.

The Electronic Code Book technique has several undesirable properties. More particularly, in addition to security problems as discussed above with respect to block cipher codes, Electronic Code Book systems suffer from synchronization problems if the cipher text is sent to a remote location. In this case it is possible that the decoding receiver can lose time synchronization with the encoding transmitter, that is, the number of bits received doesn't equal the number of bits transmitted due to noise or problems with the communication line between the transmitting site and the receiving site. If no additional synchronization means are provided, then the transmitter and receiver may remain permanently out of synchronization and must eventually be manually resynchronized. When the transmitter and receiver are out of synchronization the data delivered by the receiver to the ultimate recipient, is completely erroneous.

For those systems which must avoid the obvious problems associated with the Electronic Code Book technique, FIPS publication No. 81 also discloses other more complicated schemes. These schemes are forms of stream ciphers which utilize a combination of past computed outputs and current inputs in a feedback arrangement whereby either encrypted data is fed back as in input to the encryption circuit along with the plain text (Cipher Feedback schemes), or the output of the encryption circuit is fed back as an input to the encryption circuit and the plain text is logically combined with the output of the encryption circuit (Output Feedback schemes).

Both Cipher Feedback and Output Feedback techniques disclosed in FIPS publication No. 81 eliminate the problem of the generation of the same cipher text for a given plain text, however only Cipher Feedback schemes solve the synchronization problem. Cipher Feedback schemes have the property that even if cipher text data is corrupted in transmission or received in error, the receiver will eventually resynchronize to the transmitted data stream, typically within a predetermined number of symbols sent or within a predetermined time period.

The price paid for the added synchronization benefits of the Cipher Feedback technique is added complexity of the encoding and decoding circuitry to handle the increased processing rates which occur. For example, when executing the Electronic Codebook technique, the D.E.S. algorithm needs to be executed only once per 8 bytes (characters) of data processed. However, in a typical Cipher Feedback system in which bytes of data are fed back to the encoding or decoding algorithm, the algorithm must be executed once per byte processed, or eight times as often as the Electronic Codebook technique. In Cipher Feedback systems in which each bit of the data is fed back, the D.E.S. algorithm must be executed once per bit processed, or 64 times as often as Electronic Codebook technique for the same eight bytes of data.

An additional undesirable aspect of Cipher Feedback techniques is "error extension". Because of the receiver's dependency on previously received data to decrypt current and future data, one symbol of data received in error typically causes a predetermined number of subsequent symbols to be decrypted erroneously. In high-error-rate conditions, such as commonly encountered with dial telephone lines, error extension may cause either a serious decrease in message transmission throughput (if error detection and retransmission of erroneously received data is utilized) or in reliability (in the absence of any error detection scheme).

Another consideration which has limited the popularity of these latter stream cipher encryption techniques disclosed in FIPS publication No. 81 is cost. Typically, special purpose integrated circuits must be included in the communications system to perform the encoding and decoding operations. Due to the large number of operations required to send ordinary text in a relatively secure fashion at a reasonable transmission speed, these special purpose circuits are complex and expensive.

Accordingly, it is an object of this invention to provide an encryption technique which performs the necessary encoding and decoding operations in a manner more efficient than prior art encryption systems.

It is another object of this invention to provide an encryption technique which will automatically detect and correct for loss of synchronization.

It is yet another object of this invention to provide an encryption technique which eliminates the problem of error extension inherent to Cipher Feedback.

It is still another object of this invention to provide an encryption technique which has the property that the same plain text input data does not yield the same cipher text.

It is a further object of this invention to provide an encryption technique has a computational complexity that is similar to that required by block encryption techniques.

It is another object of this invention to provide an encryption technique which can be implemented with relatively low cost circuitry.

It is still a further object of this invention to provide an encryption technique which ensures that messages which are damaged in transmission or storage, and are erroneously accepted by the receiving or retrieving apparatus due to an error detection code which is accepted as valid, will not cause a loss of synchronization.

SUMMARY OF THE INVENTION

The foregoing problems are solved and the foregoing objects are achieved in one illustrative embodiment of the invention in which apparatus for transmitting or storing encrypted data breaks the data into blocks and appends to each data block an error detection code which is calculated from the encrypted data block plus a unique sequence number. The sequence number is generated by a local counter and may be the number of bits, bauds, or characters transmitted and received since a previous resynchronization. The error correcting code is transmitted or stored with the associated encrypted data block, but although the sequence number is appended to the data for error code calculation purposes, it is not actually transmitted or stored with the encrypted data and error correcting code. When the encrypted data is retrieved or received, the receiving apparatus appends to each received data block a sequence number derived from a local counter which is synchronized to the counter at the transmitting or storing apparatus and a new error detecting code is calculated for comparison to the error detecting code received or retrieved with the encrypted data. A mismatch between the error detecting codes indicates a transmission or synchronization error. In either case the data can be retransmitted.

More particularly, in accordance with the invention, the basic method of encryption is the Output Feedback technique and the data is encoded in blocks. A cyclical redundancy code (CRC) which is a common error-detecting code is computed for each data block using both the encrypted data for that block and the sequence number which is appended to the encrypted data. The encrypted data and its associated CRC are then sent to the receiving station or stored. The retrieval or receiving apparatus appends to the encrypted data blocks a sequence number derived from a local counter which is synchronized to the counter at the transmitting or storing apparatus and a new error detecting code is calculated for comparison to the error detecting code received or retrieved with the encrypted data block.

Specifically, if the CRC received with, or retrieved with, a data block does not match the CRC computed over that data block and the sequence number generated the by local counter, then the received data block was either damaged in transmission, or the count in the receiver's local counter doesn't match the transmitter counter count.

In this case, the newly-computed CRC and the received or retrieved CRC are both temporarily stored in a buffer memory, and the receiving unit returns a retransmission request to the transmitting unit in plain text form. The data is re-transmitted in encrypted form along with a CRC computed as previously described. When the re-transmitted data block is received, a new CRC code is computed and the newly-computed CRC code is compared to the CRC code received with the re-transmitted data. If a mismatch exists, then the newly-computed CRC code is compared to the CRC codes which were computed for previous transmissions and stored in the CRC buffer memory. If the newly-computed CRC matches one of the stored computed CRCs, then the CRC received with the re-transmitted data is compared with the stored received CRC that corresponds to the stored computed CRC which matched the newly-computed CRC. If these two received CRCs also match, then the receiver is deemed to be out of synchronization with the transmitter, and decryption site returns a resynchronization request to the transmitter in plain text.

Alternatively, if the computed and received CRCs of a re-transmitted message match, then the message is decrypted and forwarded to the user and the CRC buffer store is cleared to receive further transmissions.

An alternative method of synchronization can be used for retrofitting the inventive method into existing encryption systems. In this alternative method, an error correction code is computed for each data block to be transmitted. However, the error correction code is computed using only the actual data to be sent. A sequence number is computed as with the previously described arrangement from the number of data units which are sent. However, in this alternative method, instead of being used as data for the error correction code calculation, the computed sequence number is retained by the transmitter and not transmitted as part of the message or of the error correction code. Along with the sequence number, the data in the corresponding block is also retained for later comparison purposes.

At the receiving end, the receiving apparatus also maintains a sequence number independently of the transmitting end, which sequence number is maintained by a local counter. The transmitting counter and the receiving counter are initially synchronized during the general synchronization of the entire system.

During operation, when a block of encrypted data is received, the receiving apparatus first verifies proper block receipt by locally computing a block error correction code from the received data and comparing the computed code against the error correction code copy received with the data. If the computed and received codes match (indicating the correct receipt of the data) the receiving apparatus adjusts the locally maintained copy of the sequence number to indicate reception of a new block of information.

In order to maintain synchronization between the transmitting and receiving ends, the receiving apparatus periodically acknowledges the last validly received block or group of blocks by computing and returning an acknowledgment message consisting of an identifier of the last validly received block, plus the receiving apparatus's current sequence number and an error correction code.

At the transmitting end, the transmitting apparatus uses the error correction code sent with the acknowledgment message to verify proper receipt of the acknowledgment message contents. If the acknowledgment message has been received properly, the transmitting apparatus then compares the sequence number received from the other end to the sequence number stored for the block which is identified in the acknowledgment message. If the sequence numbers match the system is synchronized. If there is no match then a resynchronization procedure is initiated.

DETAILED DESCRIPTION OF THE PREFERRED EMBODIMENT

Figure 1:
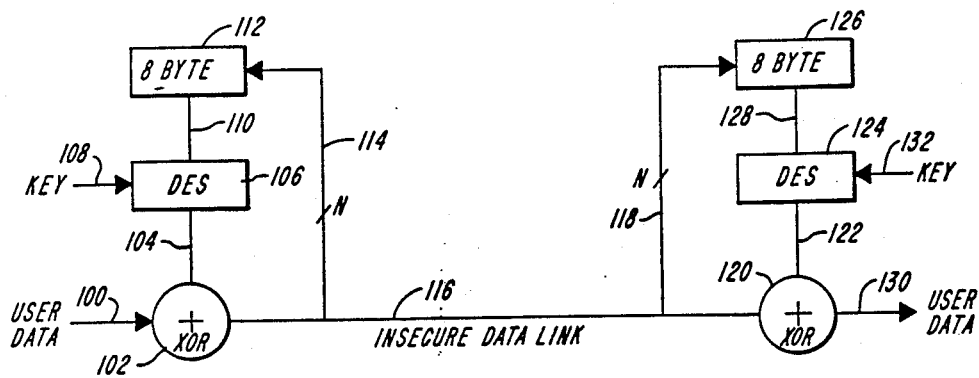
FIG. 1 is a block schematic diagram of a typical prior art Cipher Feedback encryption technique as disclosed in FIpS publication No. 81.

A block diagram which illustrates the technique of Cipher feedback as disclosed in FIPS publication no. 81 is shown in FIG. 1. Although in the ensuing description, reference is made to transmission and reception of information, it is to be understood that the same principles apply to storage and retrieval of data also. With a Cipher Feedback system, the user plain text data stream enters the encoding apparatus shown on the left hand side of FIG. 1 in a serial bit stream on line 100 (the bits of the serial stream represent the digital code used to digitally encode the characters of the plain text message). Data stream 100 is applied to one input of a bit-by-bit exclusive-OR logic circuit 102. The other input 104 of exclusive-OR circuit 102 is provided by D.E.S. encryption circuit 106.

Encryption circuit 106 comprises a well known circuit which executes the D.E.S. algorithm using an encoding key provided on bus 108 which may be a multi-wire bus with one bit of the key code provided on each wire (illustratively, the key used with the standard D.E.S. algorithm is 56 bits). The D.E.S. circuit details are well-known and are described in the aforementioned FIPS publication No. 46 and U.S. Pat. No. 3,958,081 and will not be described further hereinafter.

As an additional input 110, encryption circuit 106 receives the output of eight byte (64-bit) shift register 112. Encryption is performed in cycles of 64 bits each. During an encryption cycle, in response to the output of register 112 and the key input 108, encryption circuit 106 generates a stream of encrypted bits which are supplied to gate 102.

Following the encryption cycle, shift register 112 is, in turn, serially loaded with the encrypted cipher text bits produced sequentially by exclusive-OR gate 102 via line 114 and an equal number of bits from the prior contents are shifted out and discarded (in a standard D.E.S system, the output of gate 102 would be 1 to 64 sequential bits corresponding to 1 to 64 bits of incoming plain text data). At the end of the encryption cycle, the newly loaded and shifted bits in register 112 are applied to its outputs for encrypting data during the next encryption cycle. Thus, during operation, the result of encrypting the input data stream 100 produced by gate 102 on output line 116 is fed back to shift register 112 and re-encrypted for the next encryption cycle. The number of bits fed back for each encryption cycle is "N" where N may range from 1 to 64 bits. The encrypted cipher text on line 116 (which may be insecure) is then sent to the receiving apparatus.

At the receiving end shown at the right hand side of FIG. 1, an analogous operation to the encoding operation takes place in that data received over line 116 is shifted into an eight byte shift register 126 to allow for decryption during the next decryption cycle. At the start of each decryption cycle, the contents of register 126 are provided to its outputs 128 and to D.E.S. circuit 132 which may contain identical circuitry as D.E.S. circuit 106. In response to the outputs 128 of register 126 and decoding key 132, circuit 124 provides outputs on line 122 which are applied to exclusive-OR gate 120. The encrypted cipher text bits on line 116 are applied to gate 120 which reproduces the plain text at its output 130.

In order for decryption to take place properly, the outputs of register 128 during the decryption of a block of cipher text must be the same as the outputs of register 112 were when the block of cipher text was encrypted. With the system shown in FIG. 1, single bit channel errors occurring in transmission of the data on line 116 during an encryption cycle, in general, cause the contents of register 126 to differ from the contents of register 112 when the data was encrypted. Thus, during the next decryption cycles, when the contents of the register are provided to D.E.S circuit 132, the incoming cipher text will be erroneously decrypted resulting in up to 64 bits of erroneous data decoded at the receiver output line 130.

Figure 2:
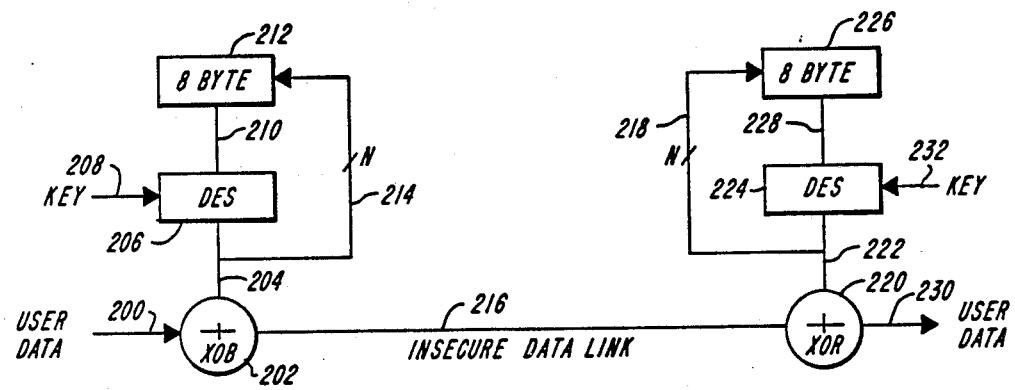
FIG. 2 is a block schematic diagram of a typical prior art Output Feedback encryption technique as disclosed in FIPS publication No. 81.

FIG. 2 illustrates the standard method of encoding data with the Output Feedback technique as disclosed in FIPS publication No. 81. This arrangement functions in an overall sense in a manner similar to that circuitry shown in FIG. 1 with the exception that the feedback paths are different. In general, the overall arrangement of the components is the same so that corresponding numbers are used in FIGS. 1 and 2. With the Output Feedback technique, on the transmitting side, the output of D.E.S circuit 206 on line 204 is fed back, via line 214 to shift register 212. Similarly on the receiving side, the output of D.E.S. circuit 224 is fed back, via line 218 to shift register 226. The effect of this change in feedback paths is that the D.E.S. circuits at both the receiving and transmitting ends act as free-running pseudo-random number generators whose output is exclusive OR-ed with the input data stream 200 at the transmitting end (by gate 202) and with the encrypted data stream on line 216 at the receiving end (by gate 220).

Encrypted data may be properly received as long as both D.E.S. circuits 206 and 224 are in "synchronization". As with the Cipher Feedback scheme, synchronization means that the outputs of register 226 during the decryption of a block of cipher text must be the same as the outputs of register 212 were when the block of cipher text was encrypted. In contrast to the Cipher Feedback arrangement, single bit errors due to channel noise on line 216 result only in single bit errors in the received data stream rather than 64 bits being in error. However, synchronization may be permanently lost if the number of bits received differs from the number transmitted due to the loss or gain of a bit or bits during transmission. Thus, the Output Feedback technique, by itself, provides no protection against the loss of transmitter/receiver synchronization due to losses or gains of data bits in the received encrypted data stream, and a single error in received data can result in a continuous output stream of erroneous data.

Figure 3:
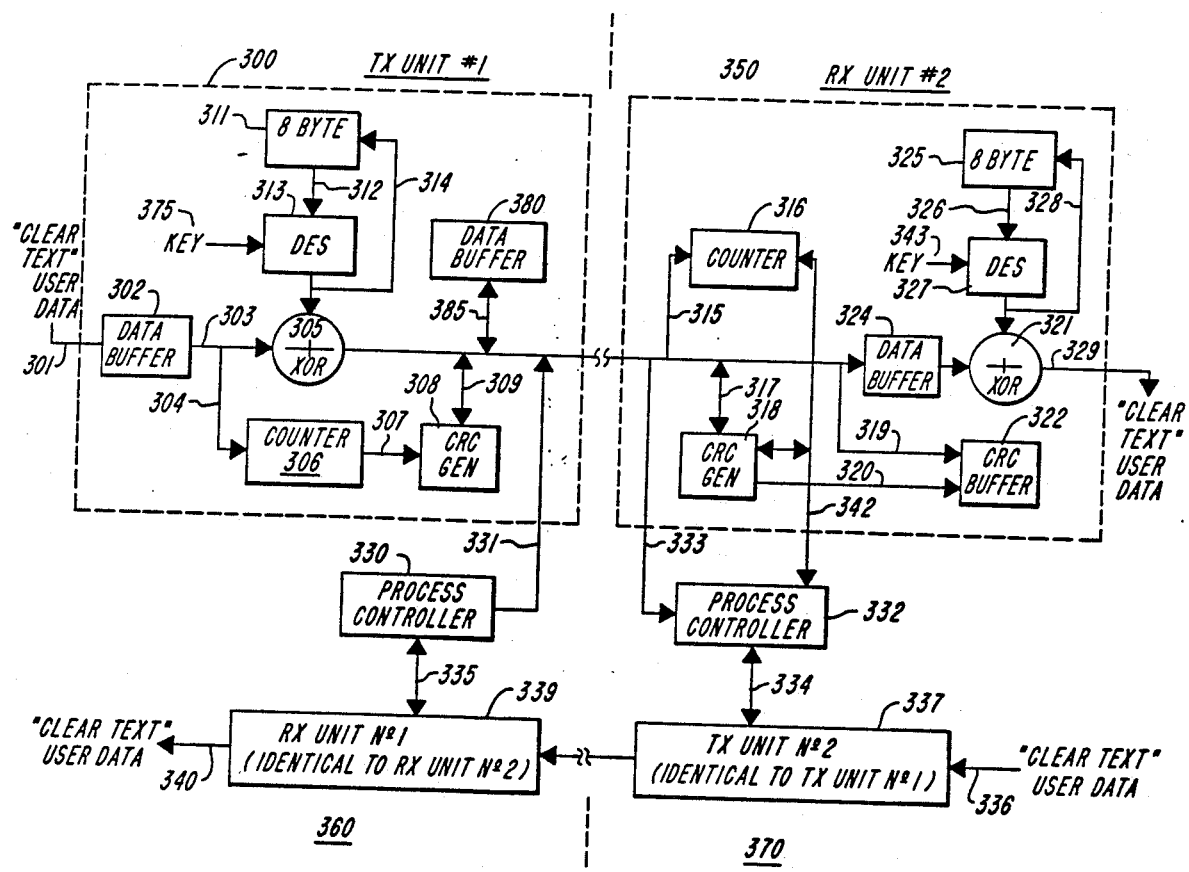
FIG. 3 is a block schematic diagram of the encryption technique of the present invention.

In accordance with the invention, the basic transmission technique used in Output Feedback can be modified to provide for synchronization loss detection and re-synchronization in the event of losses or gains of data bits in the received encrypted data stream. FIG. 3 shows an illustrative embodiment of two data communications units, 360 and 370, which can exchange encrypted data. Each of units 360 and 370 consists of transmitting apparatus and receiving apparatus, both of which are constructed in accordance with the invention. The left side of the Figure constitutes unit 360 and the right side of the figure constitutes the other unit 370. Considering the left-hand side unit 360, the encryption transmitting apparatus is shown enclosed in dashed lines and designated as apparatus 300. Transmitting apparatus 300 comprises components 301–309, 311–314, 331, 375, 380, 385 which will be described in detail hereinafter. Unit 360 also has receiving apparatus 339 which will be described hereinafter and is capable of receiving and decoding encrypted data. The operation of transmitting apparatus 300 and receiving apparatus 339 is coordinated and controlled by process controller 330 which may be a microprocessor.

Considering the right hand side unit 370, the receiving or decryption apparatus 350 is shown enclosed in dashed lines. Receiving unit 350 comprises components 315–329, 333, 342, 343 and is the encryption receiver for unit 370. The encryption receiver 339 of unit 360 is identical to the encryption receiver 350 of unit 370. Similarly, the encryption transmitter apparatus 337 of unit 370 is identical to the encryption transmitter apparatus 300 of unit 360. Thus the details of apparatus portions 339 and 337 have been omitted for clarity. Unit 370 also has a process control circuit 332 (which may also be a microprocessor) for controlling the operations of apparatus 350 and 337.

The data format generated by the transmitter apparatus and subsequently recovered by the receiver apparatus, can be any type of digital data format in which the insertion of small amounts of delay and data overhead (such as CRC bytes) are acceptable. The simplest format which meets this criteria is the asynchronous data format. In this format, the transmitters and receivers need not work with high-level protocol commands and limited amounts of delay can be added following any data character. Other formats, such as synchronous data formats can also be used, but the transmitter and receiver apparatus must be able to operate with often complicated protocols, and messages must be delivered to the receiver apparatus without internal intervening delays between characters.

The implementation of the apparatus shown in FIG. 3 may be performed in a variety of ways. The exact manner of implementation is not important to the invention. For example, the components of apparatus portions 300, 337, 339 and 350 may be constructed using wired circuit components such as discrete registers and hard-wired logic, or alternatively, the apparatus may be implemented in software which runs on a general-purpose processor or micro-processor. Combinations of hardware and software are also appropriate; for example, the D.E.S. algorithm circuits may be special purpose integrated circuit chips while the remainder of the circuit may be implemented with a micro-processor and software.

Referring to FIG. 3, plain text user-supplied data to be encrypted is delivered to unit 360 over line 301 and stored in data buffer 302, where the data is divided into blocks or messages to be encrypted and transmitted to unit 370.

In accordance with the Output Feedback technique previously described, D.E.S. algorithm circuit 313 together with 56-bit encryption key 375, eight-byte register 311 and feedback paths 312 and 314 form a pseudo-random number generator whose output is bit-by-bit exclusive OR-ed by gate 305 with user data from data buffer 302 provided via line 303. The output of gate 305 forms encrypted cipher text which is transmitted on line 310.

In accordance with one aspect of the invention, counter 306 develops a count related to the data block or message being encrypted. Illustratively this count may be the number of data units transferred to encryption unit 370 since the last re-synchronization operation between units 360 and 370. A data unit is typically the largest unit of which a portion cannot be lost or gained without the loss or gain being detected by the system. For asynchronous communication lines a data unit is typically one character. For synchronous lines a data unit is typically one bit. In communications systems using modems at each end of the communications line, a data unit may be one baud. Larger data blocks may be used with error-correcting modems.

Counter 306 may be a simple incrementing counter or a modulus counter, that is, a counter which starts from a beginning count and increases until the count reaches a maximum count (the modulus)—the counter then resets to the beginning count to continue the count. Counter 306 may also count in psuedo-random numbers as long as the numbers do not repeat over the modulus of the counter.

Assuming, for purposes of illustration, that communications line 310 is an asynchronous line, the number of characters forming each data block transmitted from unit 302 to gate 305 may be passed, via line 304 to counter 306. In this case, counter 306 is arranged to count only the number of characters in new messages which are being transmitted to unit 370; as will hereinafter be described, character counts for message re-transmissions are not counted by counter 306. Thus, as each character in the message is set to gate 305 to be encoded, the count in counter 306 increases.

Encrypted data on line 310 is also provided to data buffer store 380 via bus 385. Buffer store 380 stores the encrypted data in the event that a re-transmission is requested by the decrypting unit 370 as will be hereinafter described. It is also possible to store the plain text data bits in data buffer 302 for re-transmission, but then a re-encryption must be done with the value in register 311 restored to its value prior to encrypting the message, and the count in counter 306 must not be incremented by the number of bits re encrypted. Both of these operations consume additional time and thus slow the system down.

In order to transmit encoded characters produced by gate 305 to unit 370, a starting synchronization flag, plus message header information, is first sent to data transmission line 310 by conventional circuitry (not shown). Subsequently, the message bits, following encryption at exclusive-OR gate 305, are passed onto transmission facility 310. As each bit is sent over line 310 to unit 370, it is also provided, via line 309 to cyclic redundancy code generator 308.

Generator 308 is a conventional device which accepts incoming data bits (in this case the encrypted cipher text bits) and generates a CRC which can be used to detect errors in transmission. The complete CRC is a multi-bit code that is generated by circuit 308 after all data bits have been passed to the CRC circuit. Generator 308 can generate a CRC in one of a variety of ways, for example, by using feedback shift registers. The theory and application of CRCs is well-known and described in detail in "The Theory of Error Correcting codes", F. J Mac Williams and N. J. A. Sloane, North Holland Publishing Co. 1981 and "Error Correcting codes", W. Peterson, M.I.T Press, 1970. In response to the message header information, plus encrypted characters, CRC generator 308 begins computing the CRC code.

When the final character of the message has been encrypted, and passed through CRC generator 308, the count in counter 306 which is now equal to the character count in the message (plus the character counts for all previous messages, if any, transmitted since the last resynchronization of the transmitter and receiver) is passed as a multi-bit digital code, via line 307, to CRC generator 308. Generator 308 treats the count bits from counter 306 as though they were message data bits and continues to compute the CRC. The resulting CRC is thus computed over a set of bits including the message header bits, and the encrypted data bits with the count bits treated as if they were appended to the data but not encrypted. After the last count bit has been processed by the CRC circuit 308, the computed CRC is then passed via line 309 to data transmission facility 310 where the CRC code bits are treated as additional characters in the message being sent. In accordance with the invention, the count bits developed by counter 306 are not transmitted explicitly.

The transmitting apparatus in unit 370 operates in analogous fashion. Data links 310 and 338 connecting units 360 and 370 may pass through a modem or pair of modems attached to a public or private telephone network, or other data transmission means. Data links 310 and 338 transmit in opposite directions, and represent either a full-duplex, or a half-duplex communications path between encryption units 360 and 370.

In unit 370, the start of an incoming message transmitted from unit 360 is recognized by process controller 332 in unit 370 which receives incoming data via link 333. More specifically, controller 332 recognizes the starting synchronization flag for the message which was sent over line 310 before the message bits.

In response to the starting synchronization flag and prior to the addition of any new character counts to receiver counter 316, the current value in counter 316 is read by process controller 332 via link 342, and stored for recovery purposes, in case the received message is detected to be in error.

After the starting synchronization flag and message header is received, the encrypted data bits begin arriving. As each character arrives its presence is signaled, via link 315, to counter 316, which maintains a total count of the number of characters received. This total count includes the number of encrypted characters in validly-received messages since the last re-synchronization sequence from unit 360, as well as the number of encrypted characters received in the current message.

Incoming data bits from transmission line 310 are also passed to cyclic redundancy code generator 318, via line 317, and to data buffer 324 where the bits are stored for decryption. As with CRC generator 308, generator 318 begins computing a CRC based on the incoming message header and encrypted data bits. The entire message, excluding the initial flag bits and the final CRC bits, is passed to generator 318. After the number of bits constituting the message have been received, the remaining bits constituting the CRC sent with the data bits are forwarded over line 333 to controller 332 and, via line 319 to CRC buffer 322 where the received CRC is temporarily stored.

After all bits in the message have been received, the count in counter 316 is gated over line 342 to CRC generator 318 which continues computing the CRC treating the count bits as appended to the incoming data bits. After all count bits have been passed through the generator 318, the computed CRC is passed to controller 332 by means of bus 342.

Process controller 332 compares the computed CRC against the CRC received as part of the current message. If the CRCs are equal, then the received message is presumed valid, and is decrypted and passed to the end user as plain text, via line 329.

Decryption of the incoming data is similar to encryption, in that the decryption apparatus consists of eight-byte register 325, whose output is provided, via bus 326, to D.E.S. circuit 327. Circuit 327 together with 56-bit decryption key 343, feedback lines 326 and 328, and exclusive-OR gate 321, is used in an Output Feedback configuration as previously described and operates as a pseudo-random generator in an identical fashion to the analogous circuitry in the transmission apparatus 300 in unit 360. The output of the pseudo-random generator is bit-by-bit exclusive-ORed with the encrypted user text from buffer 324 which is provided to gate 321 over line 323, to generate the un-encrypted plain text sent to the user over line 329.

Alternatively, if the computed CRC and the received CRC do not match, then, under control of controller 332, the computed CRC is transferred to and temporarily stored in CRC buffer 322 over line 320. Controller 332 then sets the count in counter 316 to its value prior to the erroneously-received message (which value was stored as previously described).

Finally, controller 332 causes transmission apparatus 337 to send a plain text message to unit 360 indicating that the last message was incorrectly received. More specifically, the error message is passed by process controller 332, via line 334, to the transmitter apparatus 337, which thereupon transmits the error message, via data communications line 338 to receiver apparatus 339 in unit 360. Apparatus 339 passes the received message to process controller 330 via line 335. Process controller 330 then causes the message received in error by unit 370 to be re-transmitted by transmitting apparatus 300. As previously mentioned, the already encrypted data is stored in buffer 380 for this purpose. The count in counter 316 in transmitter apparatus 300 is not updated before this latter re-transmission or before any subsequent re-transmissions of the same message (if any are required).

The re-transmitted message is received by unit 370 and processed by receiver apparatus 350 which re-computes a new CRC. If the re-computed CRC and re-received CRCs match as determined by controller 332, then the message is assumed to have been received properly, is decrypted and passed to the user, and the contents of the CRC buffer 322, are cleared by controller 332.

If the re-received and re-computed CRCs do not match, then controller 332 compares them to the previous sets of CRCs stored in buffer 322 during the processing of the previous erroneously received message. In particular, the controller first compares the re-computed CRC to the stored computed CRCs. If the re-computed CRC for the re-transmitted message matches the stored computed CRC for any previous message, then the re-received CRC is compared to the stored received CRC for that previous message. If this latter comparison also results in a match, then process controller 332 determines that units 360 and 370 are out-of-synchronization for transmission from unit 360 to unit 370.

If there is no match, then controller 332 continues to compare the CRC pair for the re-transmitted message to stored pairs until all stored pairs have been tried. If no match between both members of the CRC pair for the re-transmitted message and the corresponding members of stored pairs is detected, then the re-computed and re-received CRC pair from the re-transmitted message is stored in CRC buffer 322 along with the previously stored CRC pairs, and another re-transmission request is made to unit 360 in the manner previously described. This re-transmission process continues, until process controller 332 determines that a message has been validly received or that transmitter apparatus 300 and receiver apparatus 350 are out of synchronization; the CRC buffer becomes full or a predetermined maximum number of re-transmissions is exceeded.

At the end of the re-transmission process as determined in the preceding paragraph, in all cases but the message validly-received case, process controller 332 sends to unit 360 a plain text message requesting re-synchronization of channel 310. Upon receipt of this request, process controller 330 in unit 360 clears counter 306 and generates either a 64-bit random number, or a 64 bit pseudo-random number which is loaded into 8-byte register 311. The transmission process is then started, and a message including the value loaded into register 311 is transmitted (with the appropriate header information and appended CRC) to unit 370, as a plain text "initialization vector".

Upon receipt of the bits constituting this vector (if the vector is validly received as indicated by the received CRC), process controller 332 causes character counter 316 to be reset, and transfers the 64-bit initialization vector to 8-byte register 325. If the re-synchronization message is not properly received, then the re-synchronization request is repeated by unit 370, until the message is properly received.

If the re-synchronization request is properly received, then unit 370 informs unit 360 of the proper reception. Proper reception can be acknowledged by unit 370 sending a copy what it received to unit 360, or by unit 370 encrypting a constant using the initialization vector, and then sending the encrypted constant to unit 360.

Reverse channel 338 between units 360 and 370 functions in a manner identical to channel 310.

The above-described illustrative embodiment which operates in accordance with the invention allows an out-of-synchronization condition to be detected without incurring the error extension problems of the Cipher Feedback technique. However, even with the additional transfer of sequence information via the CRC, it is still possible for for a loss-of-synchronization condition to go undetected, but the probability of such an occurence is acceptably low.

More specifically, the loss of synchronization could occur without being detected if invalid messages were received with valid CRCs and thus erroneously accepted by the receiver. Assume, for purposes of illustration, a system in which a 16-bit CRC is used. Then the probability that a data block that has been damaged during transmission is received with a valid CRC is less than one in $2^{16}$.

Consider the reception of an invalid message in which the length of the received message doesn't match the length of the transmitted message due to message corruption during transmission. As previously mentioned with the Output Feedback technique, such a corruption results in loss of synchronization between the transmitter and receiver. Generally, this invalid message will be detected immediately by the receiver because the CRC computed by it will not match the CRC received over the communication path. However there is a small probability that the CRCs will match and thus the receiver will accept the message as valid even though the message itself is invalid. The probability of the invalid message being accepted by the receiver is the probability of the message being received in error (assume this probability is $1/P_e$) times the probability that a proper CRC is received even though the message is erroneous (thus the overall probablility is less than one in $P_e * 2^{16}$). However, in this case, assume that the counts in the counters associated with the transmitter and the receiver do not match.

When the transmitter and receiver are out of synchronization, the CRC of message constructed by the transmitter using the current count in the transmitter's counter will not match the CRC computed by the receiver since the receiver uses the count in its counter for computing the CRC. Thus, the receiver will be alerted to an error and proceed to determine whether the cause of the error is an error in transmission or a loss of synchronization.

However, there is again a small probability that the second message is received in error but its CRC still matches the CRC compouted by the receiver due to a second transmission error. The probability of the second invalid message being accepted by the receiver is again the probability of the message being received in error times the probability that a proper CRC is received for an invalid message less than one in $(P_e * 2^{16})$.

Even in an extremely noisy environment where up to one-half of the messages received are invalid and thus the probability that a message is received in error is one out of two ($P_e = 2$), the probability of the combined event of two invalid messages in a row being received with valid CRCs is not greater than one in $2*2^{16}*2*2^{16}) = 1$ in $2^{34}$, or a probability of $5.8 \times 10^{-11}$. Thus, the probability that a loss of synchronization is not detected using this invention is very low even in extremely noisy environments.

Further, even if the second data block is erroneously accepted, the probability of a third data block being erroneously accepted is less than 1 in $2*2^{16}*2*2^{16}*2*2^{16} = 1$ in $2^{51}$, or a probability of $4.4 \times 10^{-16}$. Therefore, the probability of not detecting a loss of synchronization using this invention, declines exponentially with each successive transmission of a data block.

Alternatively, consider the case where a bits (or bits) of a data block are damaged, but no bits are lost or inserted. Although the data received in this block will be erroneously decrypted, the transmitter and receiver remain in synchronization, and subsequent data blocks can be received properly.

The above described arrangement can also be used with existing encryption/decryption apparatus by modifying the CRC code generation circuitry to process the sequence number as well as the actual transmitted data. However, in some cases, it is difficult to modify existing CRC code generation circuitry because the CRC code generation and checking registers are not directly accessable in many serial interface device integrated circuits. In this latter case the above described method cannot be efficiently implemented.

However, in accordance with another embodiment of the invention, the aforementioned difficulties can be overcome by checking for synchronization without directly modifying the existing CRC code.

More particularly, as with the previous arrangement, the basic method of encryption is the Output Feedback technique and the data is encoded in the blocks. However, the cyclical redundancy error correcting code is computed for each data block using only the encrypted data for that block and not the sequence number information. The encrypted data and its associated CRC are then sent to the receiving station.

A sequence number is computed for each block and all blocks previously transmitted since the previous resynchronization, but instead of being used in the process of generating the CRC code, the sequence number and a copy of the block data associated with that sequence number are stored at the transmitiing station until a subsequent block acknowledgement message is received, in case retransmission or resynchronization is required.

In response to incoming data from the transmitting station, the receiving apparatus first verifies that the block was properly received by recomputing the block CRC from the incoming data and comparing the recomputed block to the received CRC information. The receiving apparatus also maintains a sequence number independently of the transmitting end, which sequence number is maintained by a local counter. The transmitting counter and the receiving counter are initially synchronized during the general synchronization of the entire system.

If a data block has been properly received, the receiving apparatus increments its current sequence number by the number of bits, bauds or characters in the current block (depending on the data "unit" used in the system). If the block has not been received correctly, a request for retransmission is returned to the transmitting apparatus and the sequence counter is not incremented.

Periodically, the receiving apparatus computes an acknowledgment message to verify the proper receipt of previously transmitted blocks, and includes, as part of that message, the sequence number computed locally at the receiving apparatus. The sequence number included in the acknowledgment message includes the number of data units transmitted including those in the last block transmitted before the acknowledgment signal is transmitted. A CRC code is also computed by the receiving apparatus using the data in the entire acknowledgment message and appended to the message.

The receiving unit of the transmitting apparatus first checks to insure that the acknowledgment message has been correctly received by means of the appended CRC code. The transmitting apparatus then compares the received sequence number against the one previously stored for the block being acknowledged. If they do not match, then the transmitting apparatus assumes that the transmitting ans receiving unit have lost synchronization, and will generate a resynchronization message.

I claim:

1. In an encrypted data processing system having encryption and decryption units, said encryption unit containing encryption circuitry for receiving a plurality of plain text data units and for generating encrypted data units, means for computing a first error-detecting code from encrypted data units, and processing apparatus for processing said encrypted data units with said first error-detecting code appended thereto to said decryption unit, said decryption unit having additional processing apparatus, means for computing a second error-detecting code from processed data units, means for comparing said second error-detecting code with said first error-detecting code to determine an error in transmission, and decryption circuitry for generating plain text data units from said processed data units, the improvement comprising:

means for initially synchronizing said encryption circuitry and said decryption circuitry, a first sequence counter responsive to input plain text data for generating a first sequence number with a mathematical relationship to the number of data units encrypted by said encryption apparatus since said initial synchronization, a second sequence counter responsive to data units received by said decryption unit for enerating a second sequence number with said mathematical relationship to the number of data units received by said decryption apparatus since said initial synchronization, means responsive to data units received by said decryption unit for generating an identification signal which uniquely identifies said data units, means responsive to said second sequence number and to said identification signal for generating an acknowledgment message indicating said second sequence number and said identification signal and for transmitting said acknowledgment message to said encryption unit, and means responsive to said second sequence number contained in said acknowledgment message and to said first sequence number for detecting a mismatch between said numbers indicating a loss of synchronization between said encryption and decryption circuitry.

2. The improvement according to claim 1 wherein said first sequence counter generates a count which is equal to the number of data units encrypted by said encryption apparatus.

3. The improvement according to claim 1 wherein said second sequence counter generates a count which is directly related to the number of data units validly received by said decryption apparatus.

4. The improvement according to claim 1 wherein said second sequence counter generates a count which is equal to the number of data units received by said decryption apparatus.

5. The improvement according to claim 1 further comprising means responsive to a mismatch between said first and second sequence numbers for generating a re-processing request to cause said encryption unit to re-process said encrypted data units.

6. The improvement according to claim 5 further comprising means responsive to said re-processing request for preventing said first sequence counter from counting said re processed data units.

7. The improvement according to claim 5 further comprising means responsive to a predetermined number of re-processing requests for causing a resynchronization of said encryption circuitry with said decryption circuitry.

8. The improvement according to claim 1 wherein said first sequence counter is a modulus counter with a predetermined fixed, modulus.

9. The improvement according to claim 1 wherein said first sequence counter is a modulus counter having a variable modulus.

10. The improvement according to claim 1 wherein said first sequence counter is a pseudo-random counter generator.

11. The improvement according to claim 1 wherein data sent to said data processing unit comprises encrypted data units, synchronization flags and error detection codes and said first sequence count includes only said encrypted data units.

12. The improvement according to claim 1 wherein data sent to said decryption unit comprises encrypted data units, synchronization flags and error detection codes and said first sequence count includes said encrypted data units and a portion of said synchronization flags and error detection codes.

* * * * *